United States Patent [19]
Takahashi et al.

[11] Patent Number: 5,886,077
[45] Date of Patent: Mar. 23, 1999

[54] RARE-EARTH-IRON-NITROGEN BASED MAGNETIC MATERIAL AND METHOD OF MANUFACTURING THE SAME

[75] Inventors: Takeshi Takahashi, Osaka; Kiyoshi Kojima, Nara, both of Japan

[73] Assignee: Matsushita Electric Industrial Co., Ltd., Osaka, Japan

[21] Appl. No.: 898,806

[22] Filed: Jul. 23, 1997

Related U.S. Application Data

[62] Division of Ser. No. 570,666, Dec. 11, 1995, Pat. No. 5,684,076.

[30] Foreign Application Priority Data

Dec. 16, 1994 [JP] Japan .................................. 6-313590
Apr. 24, 1995 [JP] Japan .................................. 7-098997

[51] Int. Cl.⁶ ........................... C08K 3/10; H01F 1/055; H01F 1/06
[52] U.S. Cl. ........................ 524/403; 524/413; 524/435; 148/105; 148/230; 148/101
[58] Field of Search .................... 524/403, 413; 148/105, 230

[56] References Cited

U.S. PATENT DOCUMENTS

| | | | |
|---|---|---|---|
| 4,869,864 | 9/1989 | Mazany | 524/435 |
| 4,988,755 | 1/1991 | Dickens, Jr. et al. | 524/403 |
| 5,244,510 | 9/1993 | Bogatin | 148/104 |
| 5,266,128 | 11/1993 | Bogatin | 148/101 |
| 5,425,818 | 6/1995 | Hirosawa et al. | 148/103 |

FOREIGN PATENT DOCUMENTS

| | | |
|---|---|---|
| 5-175022 | 7/1993 | Japan . |
| 5-304008 | 11/1993 | Japan . |
| 6-045121 | 2/1994 | Japan . |

OTHER PUBLICATIONS

1990 J.M.D. Coey et al., "Improved Magnetic Properties by Treatment of Iron–Based Rare Earth Intermetallic Compounds in Ammonia", *Journal of Magnetism and Magnetic Materials,* pp. L251–L254.

Richard M. Bozorth, "Ferromagnetism", Bell Telephone Laboratories, Inc., pp. 4–5. D. Van Nostrand Co. Princeton, N.J.

*Primary Examiner*—Tae Yoon
*Attorney, Agent, or Firm*—Merchant, Gould, Smith, Edell, Welter & Schmidt, P.A.

[57] ABSTRACT

A rare earth-iron-nitrogen based magnetic material has superior magnetic properties. A method of manufacturing the rare earth-iron-nitrogen based magnetic material controls the decline in the magnetic properties of the material during pulverizing processes, and pulverizes the material to a critical particle dimension for single-domain behavior. The fragility of the material is increased since the material includes at least one element selected from the group consisting of Ti, Zr, Hf, V, Nb, Ta, Cr, Mo and W at 0.05–5% atomic percentage. The material is pulverized by a gas current type jet mill. Sample powder injected from a hopper is introduced from a supply mouth to a pulverizing chamber by nitrogen gas spouting from a pressure nozzle, and the powder is then accelerated to acoustic velocity by high pressure nitrogen gas spouting from gliding nozzles. As a result, the powder particles collide with each other. Pulverization is mainly carried out by collisions between powder particles, but can be accomplished by the collision of powder particles against the inner wall of a pulverizing chamber. The powder is then exhausted from a classifying zone.

21 Claims, 2 Drawing Sheets

RARE-EARTH-IRON-NITROGEN BASED MAGNETIC MATERIAL AND METHOD OF MANUFACTURING THE SAME

This is a Divisional of application Ser. No. 08/570,666, filed Dec. 11, 1995, now U.S. Pat. No. 5,684,076, which application(s) are incorporated herein by reference.

FIELD OF THE INVENTION

This invention relates to a rare earth-iron-nitrogen based magnetic material which can be useful for a bonded magnet and the like, to be molded into a certain shape from a mixture of resin and a powdered magnetic material, and a method of manufacturing the same.

BACKGROUND OF THE INVENTION

It was recently discovered that a rare earth-iron-nitrogen based alloy prepared by dissolving an alloy of rare earth metal and iron and nitrogen has excellent magnetic properties. When Sm is used as the rare earth metal, the rare earth-iron-nitrogen based alloy has a uniaxial magnetic anisotropy. With the composition of $Sm_2Fe_{17}N_{2.1}$, the rare earth-iron-nitrogen based alloy has high magnetic properties of 470° C. Curie-temperature, 15.4 kG saturation magnetization and more than a 60 kOe anisotropic magnetic field (J. M. D. Coye and H. Sun, J.M.M.M. 87 (1990) L 251.).

The steps mentioned below are followed to manufacture the above-noted rare earth-iron-nitrogen based magnetic material:

(1) preparing a base alloy;
(2) roughly grinding the alloy;
(3) nitriding the alloy; and
(4) pulverizing the alloy (making single-domain particles).

It is known that the rare earth-iron-nitrogen based magnetic material has a strong uniaxial magnetic anisotropy and improved Curie-temperature and saturation magnetization when nitrogen is introduced to the base alloy. In the nitriding treatment step, the rare earth-iron based material powder is treated with heat in nitrogen gas, ammonia gas, hydrogen-nitrogen mixed gas, hydrogen-ammonia mixed gas or the like. In order to keep the coercivity of the rare earth-iron-nitrogen based alloy at a high level, the alloy has to be pulverized to a critical particle dimension of less than 3 μm for single-domain behavior. The alloy is pulverized by a ball mill such as a rotating ball mill, a vibrating ball mill and an attritor or a jet mill (for example, Published Unexamined (Kokai) Japanese Patent Application No. Hei 5-175022, No. Hei 5-304008 and No. Hei 6-45121).

It is important to minimize defects such as processing strains which are formed during the pulverizing process in order to prepare magnetic powder having high magnetic properties. When many defects are formed during the pulverizing process, saturation magnetization is reduced to a great extent, thus decreasing the rectangularity in the hysteresis loop. Rectangularity in the hysteresis loop is Hk divided by iHc (coercivity) where Hk is the outside magnetic field strength when the magnetic flux density at the second quadrant of the magnetic hysteresis loop becomes 90% of the residual magnetic flux density. The rectangularity in the hysteresis loop is preferably close to 1.0. The rectangularity in hysteresis loop has a close correlation to the maximum energy product (BH) max. When the rectangularity in the hysteresis loop is low, no high maximum energy product (BH) max is obtained. Thus, it is necessary to reduce defects that can be formed during the pulverizing process in order to prepare a magnetic powder having high magnetic properties.

However, much stress is added to the crystal structure of the alloy by the above-mentioned ball mill, thus increasing defects and lowering saturation magnetization. A jet mill, though, can pulverize the alloy with little stress to the crystal structure. The pulverizing mechanism of the jet mill is divided into two types, a collision-type and a gas current type. In both types, powder is moved at high speed by pulverizing gas at high pressure. In the collision-type, the powder collides with a target, thus pulverizing the alloy. The powder particles mutually collide with each other and are pulverized in the gas current type. In pulverizing properties, the collision-type is superior to the gas current type. However, in controlling stress added to the crystal structure, the gas current type jet mill is better than the the collision-type jet mill. As a method of pulverizing the above-mentioned rare earth-iron-nitrogen based magnetic material, the gas current type jet mill is effective. However, when pulverizing the rare earth-iron-nitrogen based magnetic material by the gas current type jet mill, powder particles coagulate with each other as the particle diameter becomes small. Therefore, the treatment of pulverizing particles to a critical particle dimension for single-domain behavior by the gas current type jet mill requires a long period of time. The stress that powder particles receive during the pulverizing process accumulates and becomes large as the pulverization time increases. As a result, many defects are formed, and magnetization and rectangularity in the hysteresis loop are reduced even though the rate of reduction is smaller in the gas current type jet mill than the rate in a ball mill method.

Therefore, in order to maximize the advantage of the gas current type jet mill pulverizing method of controlling stress on a crystal structure, the pulverizing efficiency should be improved. Published Unexamined (Kokai) Japanese Patent Application No. Hei 5-175022 discloses the method of improving pulverizing efficiency by pulverizing powder particles while the temperature of the particles is kept at around the Curie-temperature (300°–650° C.) with an air current of high temperature, thus preventing the coagulation of powder particles during pulverizing. However, in this method, a device for keeping the temperature of pulverizing gas high is required, thereby increasing manufacturing cost. Published Unexamined (Kokai) Japanese Patent Application No. Hei 5-304008 discloses the method of pulverizing powder particles to an average particle diameter of 1–3 μm using wet pulverizing treatment, after pulverizing the particles to an average particle diameter of 2.5–10 μm by a jet mill. However, the rare earth-iron-nitrogen based magnetic material is likely to be oxidized, thus reducing magnetic properties. In other word, a medium which can maintain a non-oxidizing atmosphere is required, and mainly an organic solvent is used. There are also problems of safety and cost of equipment for protecting the working environment to consider. Moreover, the wet pulverizing treatment becomes a batch processing, so that productivity is poor. Published Unexamined (Kokai) Japanese Patent Application (J.P.A.) No. Hei 6-45121 discloses the method of reducing the coagulation of powder particles by pulverizing the particles at $0 \leq O_2 \leq 5$ vol % oxygen density and with a jet mill so as to cover the particle surfaces with an oxide film. However, since the magnetic properties of the rare earth-iron-nitrogen based magnetic material decline due to oxidation as mentioned above, the method disclosed in Kokai J.P.A. No. Hei 6-45121 is not preferable.

SUMMARY OF THE INVENTION

It is an object of this invention to solve the above-mentioned conventional problems by providing a rare earthiron-nitrogen based magnetic material that can easily be pulverized while maintaining the magnetic properties during a pulverizing process and has high fragility, and a method of manufacturing the material.

In order to accomplish these objects, the rare earth-iron-nitrogen based magnetic material has a composition shown in the following Chemical Formula:

$$RaFe(100-a-b-c)MbNc \quad (1)$$

wherein R is at least one rare earth element including Y; M is at least one element selected from the group consisting of Ti, Zr, Hf, V, Nb, Ta, Cr, Mo and W; N is nitrogen; and a, b and c indicate atomic percentages, and $5 \leq a \leq 20$, $0.05 \leq b \leq 5$, $3 \leq c \leq 30$, and the remainder is Fe.

It is preferable that the rare earth element in Chemical Formula 1 comprises more than 50 atom % Sm.

It is also preferable that the main phase of the magnetic material has a rhombohedral $Th_2Zn_{17}$ type crystal structure.

It is further preferable that the magnetic material has an average particle diameter of 0.01–6 μm.

It is preferable that the particle has an average particle diameter of 0.1–3 μm.

It is also preferable that the magnetic material includes of resin or a low-melting point metal. When the low-melting point metal is used, it is preferable that the melting point is less than 700° C. and that the metal is Zn, Ga, Sn, In, Pb, Bi, Al or an alloy that includes Zn, Ga, Sn, In, Pb, Bi and Al. It is more preferable that the melting point is less than the decomposition temperature of the rare earth-iron-nitrogen magnetic material (about 650° C.) and that the metal is Zn, Ga, Sn, In, Pb or Bi. Furthermore, in consideration of heat-resistance, it is preferable that the melting point is above 100° C. and that the metal is Zn, Sn, In, Pb or Bi.

The magnetic material contains at least one resin selected from the group consisting of thermosetting resin and thermoplastic resin. The thermosetting resin includes epoxy resin, phenolic resin, unsaturated polyester resin, xylene resin, urea resin, melanin resin, thermosetting silicone resin, alkyd resin, furan resin, thermosetting acrylic resin, thermosetting fluororesin, etc. The thermoplastic resin includes polyamide resin, polyolefin resin, polystyrene resin, polyvinyl resin, acrylic resin, acrylonitrile resin, polyurethane resin, polyether resin, etc.

The magnetic material is molded by at least one method selected from the group consisting of compression molding and injection molding. When the thermosetting resin is used for the magnetic material, it is preferable that the resin composition is 1–5% by weight, or more preferably 2–3% by weight, and that compression molding is used. With the use of the thermoplastic resin for the magnetic material, it is preferable that the resin composition is 7–15% by weight, or more preferably 8–12% by weight, and that injection molding is used.

The method of manufacturing the rare earth-iron-nitrogen based magnetic material includes the steps of:

preparing a base alloy;

pulverizing the base alloy;

nitriding the base alloy; and pulverizing the alloy.

The composition of the rare earth-iron-nitrogen based magnetic material before pulverization is shown in the following Chemical Formula:

$$RaFe(100-a-b-c)MbNc \quad (2)$$

where R is at least one rare earth element including Y; M is at least one element selected from the group consisting of Ti, Zr, Hf, V, Nb, Ta, Cr, Mo and W; N is nitrogen; and a, b and c are atomic percentages, and $5 \leq a \leq 20$, $0.05 \leq b \leq 5$, $3 \leq c \leq 30$ and the remainder is Fe. The rare earth-iron-nitrogen magnetic material is pulverized by a gas current type jet mill.

It is preferable that the rare earth element shown in the Chemical Formula 2 comprises more than 50 atom % Sm.

It is preferable that the main phase of the magnetic material has a rhombohedral $Th_2Zn_{17}$ type crystal structure.

It is preferable that the magnetic material is pulverized to an average particle diameter of 0.01–6 μm.

It is also preferable that the magnetic material is pulverized to an average particle diameter of 0.1–3 μm.

It is preferable that the pulverizing section of the gas current type jet mill is made of at least one material selected from the group consisting of $Al_2O_3$, SiC, $Si_3N_4$ and $ZrO_2$.

It is also preferable that the magnetic material is pulverized by particles colliding with themselves or collisions with the inner wall of a pulverizing chamber.

It is preferable that a spare pulverizing section is added to the pulverizing section of the air-type jet mill.

It is also preferable that the magnetic material is molded with resin or a low-melting point metal.

It is further preferable that the resin is at least one resin selected from thermosetting resin and thermoplastic resin.

It is preferable that the molding is carried out by at least one method selected from the group consisting of compression molding and injection molding.

Since the rare earth-iron-nitrogen magnetic material contains at least one element selected from the group consisting of Ti, Zr, Hf, V, Nb, Ta, Cr, Mo and W at 0.05–5% atomic percentage, the fragility of the material increases and the material can easily be pulverized. Thus, stress on the crystal structure during the pulverizing process can be reduced. In addition, the material can easily be pulverized to a critical particle dimension for single-domain behavior by the gas current type jet mill, and a decrease in magnetic properties during the pulverizing process is prevented, thus providing a rare earth-iron-nitrogen magnetic material with high magnetic properties. When the gas pulverizing chamber of the current type jet mill is made of ceramics or is provided with a spare pulverizing section, the pulverizing efficiency improves and the material can be pulverized in a short time. Therefore, stress on the crystal structure during the pulverizing process is reduced, and the magnetic properties improve.

The rare earth-iron-nitrogen magnetic material and the manufacturing method of this invention are explained in detail below. In this invention, R is an element providing magnetic anisotropy and generating coercivity. It is preferable that the material includes Sm as an essential element and R at 5–20% atomic percentage. When the material contains R at less than 5%, many a Fe phase (soft magnetic phase) are contained in the alloy and it is hard to obtain the desired coercivity. With more than 20% R, the volume of the magnetic phase and saturation magnetization decline.

M is provided to improve the quality of the rare earth-iron-nitrogen based magnetic material and to increase fragility. As a result, the material can easily be pulverized even by the gas current type jet mill. The material including M has high pulverizing properties, so that the pulverizing efficiency does not decline even when the powder particles coagulate during the pulverizing process. Thus, when the gas current type jet mill is used to pulverize the material, the material can easily be pulverized in a short period. Stress on the crystal structure during the pulverizing process is also reduced. M is at least one element selected from the group consisting of Ti, Zr, Hf, V, Nb, Ta, Cr, Mo and W. In order to achieve the above-noted effects, M should be included in the material at 0.05–5% atomic percentage. With less than 0.05% M, the fragility cannot be increased. When M is contained at more than 5%, a compound phase with high M density precipitates and the fragility of the material cannot increase.

N is an important element for improving the magnetic properties of the rare earth-iron-nitrogen based magnetic material. By introducing N into the mother alloy, the material shows strong uniaxial magnetic anisotropic properties, and saturation magnetization and the Curie-temperature increase. In order to achieve the effects mentioned above, N is contained at 3–30% atomic percentage. With less than 3% N, the improvement of magnetic properties due to nitriding is poor. When N is included at more than 30%, the crystal structure of the magnetic phase becomes unstable.

The rare earth-iron-nitrogen based magnetic material of this invention is prepared by the steps of (1) preparing a mother alloy, (2) roughly pulverizing the alloy, (3) nitriding the alloy, and (4) pulverizing the alloy.

(1) Preparation of a Mother Alloy

The method of preparing a mother alloy is not particularly limited. For example, a melting method is used in which R metal, M metal and iron are mixed at a predetermined ratio and a mother alloy ingot is prepared by a high frequency induction heating melting furnace or an arc furnace. The mother alloy can also be prepared by a quenching method. In the quenching method, the mixture of R metal, M metal and iron at a predetermined ratio or the mother alloy prepared by the melting method is melted and sprayed onto a copper roller which is rotating at high speed. In addition, atomizer methods can be applied. If the alloy prepared in the above-mentioned method has inhomogeneous or poor crystallinity, the alloy is treated with heat so as to improve the evenness of the crystal properties.

(2) Rough Pulverization

The method of roughly pulverizing the mother alloy is not particularly limited. For instance, the alloy can be pulverized by a crusher such as a jaw crusher and a stamp mill. The rare earth-iron mother alloy absorbs hydrogen under a heat treatment of 100°–300° C. in hydrogen and disintegrates. By utilizing this phenomenon, the alloy can be pulverized. This phenomenon occurs with hydrogen gas current. In order to save time, the alloy should be treated under high pressure and the pressure of the hydrogen is preferably high. However, in consideration of the safety of a material such as of a container, the pressure is preferably less than 80 kgf/cm$^2$. Hydrogen in the powder may be left or removed by a dehydrogenation treatment. In order to desorb hydrogen, the powder can be treated with heat at 350°–550° C. under reduced pressure. The particle diameter is set so as to evenly introduce nitrogen to a particle during nitrogen treatment. It is preferable that the particle diameter is less than 1,000 $\mu$m, more preferably less than 200 $\mu$m.

(3) Nitriding Treatment

The nitriding treatment is not particularly limited to one treatment. For instance, heat treatment in a nitriding gas atmosphere can be used. The nitriding gas includes nitrogen gas, nitrogen-hydrogen mixed gas, ammonia gas, ammonia-hydrogen mixed gas, etc. The treatment temperature is preferably from 400° C. to 600° C. When the temperature is lower than 400° C., the nitriding speed is low and thus is not preferable. The rare earth-iron-nitrogen based magnetic material decomposes into rare earth nitride and iron at a temperature higher than 650° C., so that it is not preferable to treat the alloy at a temperature above the above-mentioned. Under a nitriding gas current, the nitriding treatment can be carried out on the alloy sufficiently. However, under pressure, the nitriding speed can be increased.

(4) Pulverization

The rare earth-iron-nitrogen based magnetic material is preferably pulverized by a jet mill, especially by a gas current jet mill. When the gas current jet mill is used to pulverize the material, stress on the crystal structure during the pulverizing process is reduced and the defects such as strains are decreased compared to those of the conventional technique. As a result, the decline in saturation magnetization and also the decline in rectangularity in the hysteresis loop are controlled, and high magnetic properties are obtained. Since the magnetic properties of the rare earth-iron-nitrogen based magnetic material are susceptible to decreases a result of oxidation, it is preferable to use inactive gas for the jet mill pulverization. It is particularly preferable to use inexpensive nitrogen gas.

A cross-sectional view of one embodiment of the gas current type jet mill is shown in FIG. 1. Sample powder input from a hopper is introduced to a pulverizing chamber 3 through a supply mouth 7 by nitrogen gas spouting from a pusher nozzle 2. The sample powder introduced to pulverizing chamber 3 is accelerated to about an acoustic velocity by nitrogen gas of high pressure spouting from gliding nozzles 4 and 5, and the powder particles collide with each other. The powder particles are pulverized mainly by the mutual collision of the particles. However, the powder is also pulverized by collision against an inner wall 10 of the pulverizing chamber. The collisions against inner wall 10 of the pulverizing chamber are weaker than the collisions made by the collision-type jet mill, so that the gas current type jet mill is advantageous in that it does not reduce the effect of limiting the stress on the crystal structure during the pulverizing process. Clockwise gas current is generated inside the pulverizing chamber and is exhausted from a classifying zone 6 in a pulverizing chamber central section 11. The pulverized powder is exhausted from classifying zone 6 by the current and is collected. Powder particles having a large diameter are subjected to large centrifugal force. Such particles are not exhausted by the current, therefore, they circle in the pulverizing chamber and are further pulverized. Generally, the pulverizing chamber is made of stainless steel or ceramics. The pulverizing chamber made of ceramics has better anti-abrasion properties than the chamber made of stainless steel and is effective against contamination. In the figure 8 and 9 indicate the outer walls of the pulverizing room.

The rare earth-iron-nitrogen based magnetic material contains at least one element selected from the group consisting of Ti, Zr, Hf, V, Nb, Ta, Cr, Mo and W at 0.05–5% atomic percentage. Thus, the material has increased fragility and can be pulverized easily by the gas current type jet mill. Compared with the jet mill having a stainless steel pulverizing chamber, a jet mill made of ceramics can pulverize the material over a shorter period. In addition, pulverizing efficiency improves, and stress on a crystal structure during pulverizing can be controlled, thus providing high magnetic properties. The rare earth-iron-nitrogen magnetic material is more likely to be pulverized by the jet mill made of ceramics than the jet mill made of stainless steel. The ceramic is at least one of $Al_2O_3$, $SiC$, $Si_3N_4$ and $ZrO_2$. Even though the magnetic material can be pulverized by the gas current type jet mill having a pulverizing section made of stainless steel, it is preferable to use the gas current jet mill with a ceramic pulverizing section.

The rare earth-iron-nitrogen based magnetic material can also be pulverized by a jet mill having an auxiliary pulverizing section. FIG. 2 is a cross-sectional view of the gas current type jet mill having an auxiliary pulverizing section of one embodiment. Powder input from a hopper 21 is carried to a pulverizing chamber 23 by nitrogen gas spouting from a pusher nozzle 22. The powder introduced to pulverizing room 23 is preliminary pulverized by a center cone 24. The preliminarily pulverization at center cone 24 has the same effect as the pulverization by collision with the inner wall of a pulverizing section, improving pulverization efficiency. Center cone 24 can be made of stainless steel, but is preferably made of ceramics in consideration of pulverization efficiency. It is also important not to put much stress on the crystal structure. For example, the collision force can be controlled by adding inclination to center cone 24 or by changing pusher pressure or the distance between hopper 21 and center cone 24. The structure of the preliminary (or auxiliary) pulverizing section is not limited to the one shown in FIG. 2, and it is not necessary to carry out the preliminary pulverization before the main pulverization. The structure of the preliminary pulverizing section should be designed to provide the same effects as the ones provided by the collision against the inner wall of a pulverizing section. Preliminarily pulverized powder is truly pulverized by high-pressure gas spouting from gliding nozzle 25. A gap for circulating gas is used between a liner 26 and a chamber 27, and high-pressure gas spouting from gliding nozzle 25 is introduced to pulverizing room 23 through a plurality of holes formed in liner 26. The pulverizing and classifying mechanism is the same as the mechanism of the gas current jet mill. Roughly pulverized powder is exhausted and collected by a classifying zone 28. The pulverizing section may be made of stainless steel. However, as in the gas current type jet mill, it is preferable that the pulverizing section is made of ceramics in consideration of pulverization efficiency.

DETAILED DESCRIPTION OF THE INVENTION

Figure 1:
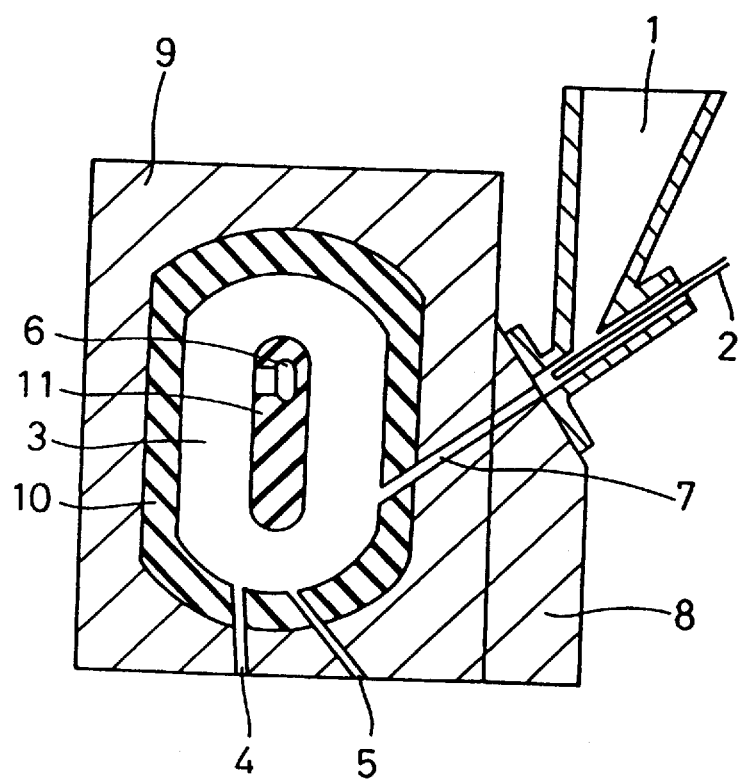
FIG. 1 is a cross-sectional view of a gas current type jet mill of one embodiment of the invention.

This invention will be described by referring to the following illustrative examples and attached figures.

Example 1

Sm of 99.9% purity, electrolytic iron of 99.9% purity and Ti of 99.5% purity were melted by a high frequency melting furnace and were poured into a mold, thus preparing an ingot. A mother alloy was prepared by subjecting the ingot to a homogenization treatment in an Ar atmosphere at 1,100°–1,200° C. for 10–24 hours. The mother alloy was roughly pulverized to less than 150 µm particle diameter in a glove box containing nitrogen. Oxygen density in the glove box was less than 100 ppm. The pulverized powder was placed in a stainless high-pressure container and was given a nitriding treatment under a high-pressure nitrogen atmosphere of 50 kgf/cm at 470° C. for 12 hours. The purity of the nitrogen gas was 99.9999%. After the nitriding treatment, the powder was further pulverized by a gas current type jet mill having a pulverizing section made of $Al_2O_3$. The atmosphere in the glove box during the pulverizing process had less than 100 ppm oxygen density, and the oxygen in the atmosphere was replaced with nitrogen. Nitrogen gas of 99.99% purity was used as the pulverizing gas, and the pulverizing gas pressure was 6 $kgf/cm^2$. As a comparison, a sample which contained no Ti was also prepared. The particle diameter and the magnetic properties of the samples were observed by a scanning electron microscope (SEM) and a vibrating sample magnetometer (VSM) respectively. The compositions, average particle diameters and magnetic properties of the samples are shown in Table 1.

TABLE 1

| | Sample No. | Composition | (1) | (2) | (3) | (4) |
|---|---|---|---|---|---|---|
| Example 1 | 1 | $Sm_{9.1}Fe_{77.29}Ti_{0.01}N_{13.6}$ | 4.5 | 13.1 | 6.0 | 0.32 |
| Example 1 | 2 | $Sm_{9.1}Fe_{77.24}Ti_{0.06}N_{13.6}$ | 2.8 | 13.3 | 8.1 | 0.39 |
| Example 1 | 3 | $Sm_{9.1}Fe_{77.13}Ti_{0.17}N_{13.6}$ | 1.5 | 13.6 | 10.6 | 0.45 |
| Example 1 | 4 | $Sm_{9.1}Fe_{76.5}Ti_{0.8}N_{13.6}$ | 1.8 | 13.3 | 10.1 | 0.50 |
| Example 1 | 5 | $Sm_{9.1}Fe_{73.4}Ti_{3.9}N_{13.6}$ | 2.9 | 13.2 | 9.5 | 0.42 |
| Example 1 | 6 | $Sm_{9.1}Fe_{71.9}Ti_{5.4}N_{13.6}$ | 4.8 | 12.7 | 5.9 | 0.31 |
| Comparative Example 1 | 7 | $Sm_{9.1}Fe_{77.3}N_{13.6}$ | 5.2 | 13.2 | 5.5 | 0.29 |

(1) Average Particle Diameter (µm)
(2) Br(kG)
(3) iHc(kOe)
(4) Hk/iHc

Example 2

As in Example 1, samples were prepared by using Sm of 99.9% purity, electrolytic iron of 99.99% purity and Zr of 99.5% purity. The compositions, average particle diameters and magnetic properties of the samples are shown in Table 2.

TABLE 2

| | Sample No. | Composition | (1) | (2) | (3) | (4) |
|---|---|---|---|---|---|---|
| Example 2 | 8 | $Sm_{9.1}Fe_{77.29}Zr_{0.01}N_{13.6}$ | 5.0 | 13.2 | 5.7 | 0.30 |
| Example 2 | 9 | $Sm_{9.1}Fe_{77.25}Zr_{0.05}N_{13.6}$ | 2.9 | 13.3 | 9.1 | 0.38 |
| Example 2 | 10 | $Sm_{9.1}Fe_{77.14}Zr_{0.16}N_{13.6}$ | 1.4 | 13.5 | 10.9 | 0.43 |
| Example 2 | 11 | $Sm_{9.1}Fe_{76.5}Zr_{0.8}N_{13.6}$ | 2.0 | 13.3 | 9.9 | 0.45 |
| Example 2 | 12 | $Sm_{9.1}Fe_{74.2}Zr_{3.1}N_{13.6}$ | 2.7 | 13.2 | 9.0 | 0.44 |
| Example 2 | 13 | $Sm_{9.1}Fe_{71.9}Zr_{5.4}N_{13.6}$ | 4.7 | 12.5 | 5.8 | 0.31 |
| Comparative Example 2 | 14 | $Sm_{9.1}Fe_{77.3}N_{13.6}$ | 5.2 | 13.2 | 5.5 | 0.29 |

(1) Average Particle Diameter (µm),
(2) Br(kG),
(3) iHc(kOe),
(4) Hk/iHc

Example 3

As in Example 1, samples were prepared by using Sm of 99.9% purity, electrolytic iron of 99.99% purity and Hf of 99.9% purity. The compositions, average particle diameters and magnetic properties of the samples are shown in Table 3.

TABLE 3

| | Sample No. | Composition | (1) | (2) | (3) | (4) |
|---|---|---|---|---|---|---|
| Example 3 | 15 | $Sm_{9.1}Fe_{77.29}Hf_{0.01}N_{13.6}$ | 4.8 | 13.3 | 5.9 | 0.34 |
| Example 3 | 16 | $Sm_{9.1}Fe_{77.24}Hf_{0.06}N_{13.6}$ | 2.6 | 13.4 | 9.1 | 0.40 |
| Example 3 | 17 | $Sm_{9.1}Fe_{77.16}Hf_{0.14}N_{13.6}$ | 2.1 | 13.7 | 9.9 | 0.46 |
| Example 3 | 18 | $Sm_{9.1}Fe_{76.5}Hf_{0.8}N_{13.6}$ | 1.8 | 13.5 | 10.3 | 0.49 |

TABLE 3-continued

| Sample No. | Composition | (1) | (2) | (3) | (4) |
|---|---|---|---|---|---|
| Example 3 | 19 | $Sm_{9.1}Fe_{75.3}Hf_{2.0}N_{13.6}$ | 2.5 | 13.3 | 9.6 | 0.42 |
| Example 3 | 20 | $Sm_{9.1}Fe_{71.9}Hf_{5.4}N_{13.6}$ | 4.2 | 12.3 | 6.2 | 0.32 |
| Comparative Example 3 | 21 | $Sm_{9.1}Fe_{77.3}N_{13.6}$ | 5.2 | 13.2 | 5.5 | 0.29 |

(1) Average Particle Diameter ($\mu$m),
(2) Br(kG),
(3) iHc(kOe)
(4) Hk/iHc

Example 4

As in Example 1, samples were prepared by using Sm of 99.9% purity, electrolytic iron of 99.99% purity and V of 99.5% purity. The compositions, average particle diameters and magnetic properties of the samples are shown in Table 4.

TABLE 4

| Sample No. | Composition | (1) | (2) | (3) | (4) |
|---|---|---|---|---|---|
| Example 4 | 22 | $Sm_{9.1}Fe_{77.29}V_{0.01}N_{13.6}$ | 4.8 | 13.3 | 5.8 | 0.33 |
| Example 4 | 23 | $Sm_{9.1}Fe_{77.24}V_{0.05}N_{13.6}$ | 2.7 | 13.5 | 9.0 | 0.42 |
| Example 4 | 24 | $Sm_{9.1}Fe_{76.91}V_{0.39}N_{13.6}$ | 1.6 | 13.7 | 10.1 | 0.46 |
| Example 4 | 25 | $Sm_{9.1}Fe_{75.7}V_{1.6}N_{13.6}$ | 2.3 | 13.5 | 9.9 | 0.57 |
| Example 4 | 26 | $Sm_{9.1}Fe_{74.98}V_{2.32}N_{13.6}$ | 2.2 | 13.2 | 8.7 | 0.55 |
| Example 4 | 27 | $Sm_{9.1}Fe_{71.7}V_{5.6}N_{13.6}$ | 4.0 | 12.8 | 6.3 | 0.39 |
| Comparative Example 4 | 28 | $Sm_{9.1}Fe_{77.3}N_{13.6}$ | 5.2 | 13.2 | 5.5 | 0.29 |

(1) Average Particle Diameter ($\mu$m),
(2) Br(kG),
(3) iHc(kOe)
(4) Hk/iHc

Example 5

As in Example 1, samples were prepared by using Sm of 99.9% purity, electrolytic iron of 99.99% purity and Nb of 99.9% purity. The compositions, average particle diameters and magnetic properties of the samples are shown in Table 5.

TABLE 5

| Sample No. | Composition | (1) | (2) | (3) | (4) |
|---|---|---|---|---|---|
| Example 5 | 29 | $Sm_{9.1}Fe_{77.29}Nb_{0.01}N_{13.6}$ | 4.4 | 13.2 | 6.6 | 0.31 |
| Example 5 | 30 | $Sm_{9.1}Fe_{77.23}Nb_{0.07}N_{13.6}$ | 2.3 | 13.5 | 9.8 | 0.40 |
| Example 5 | 31 | $Sm_{9.1}Fe_{77.14}Nb_{0.16}N_{13.6}$ | 2.2 | 13.7 | 10.1 | 0.49 |
| Example 5 | 32 | $Sm_{9.1}Fe_{76.53}Nb_{0.77}N_{13.6}$ | 1.8 | 13.6 | 10.5 | 0.50 |
| Example 5 | 33 | $Sm_{9.1}Fe_{74.2}Nb_{3.1}N_{13.6}$ | 2.9 | 13.3 | 8.9 | 0.43 |
| Example 5 | 34 | $Sm_{9.1}Fe_{71.9}Nb_{5.4}N_{13.6}$ | 5.4 | 12.4 | 5.3 | 0.29 |
| Comparative Example 5 | 35 | $Sm_{9.1}Fe_{77.3}N_{13.6}$ | 5.2 | 13.2 | 5.5 | 0.29 |

(1) Average Particle Diameter ($\mu$m),
(2) Br(kG),
(3) iHc(kOe),
(4) Hk/iHc

Example 6

As in Example 1, samples were prepared by using Sm of 99.9% purity, electrolytic iron of 99.99% purity and Ta of 99.9% purity. The compositions, average particle diameters and magnetic properties of the samples are shown in Table 6.

TABLE 6

| Sample No. | Composition | (1) | (2) | (3) | (4) |
|---|---|---|---|---|---|
| Example 6 | 36 | $Sm_{9.1}Fe_{77.29}Ta_{0.01}N_{13.6}$ | 4.4 | 13.3 | 6.1 | 0.35 |
| Example 6 | 37 | $Sm_{9.1}Fe_{77.24}Ta_{0.06}N_{13.6}$ | 2.9 | 13.4 | 8.7 | 0.42 |
| Example 6 | 38 | $Sm_{9.1}Fe_{77.14}Ta_{0.16}N_{13.6}$ | 2.1 | 13.7 | 10.0 | 0.48 |
| Example 6 | 39 | $Sm_{9.1}Fe_{76.5}Ta_{0.8}N_{13.6}$ | 2.0 | 13.6 | 10.1 | 0.50 |
| Example 6 | 40 | $Sm_{9.1}Fe_{75}Ta_{2.3}N_{13.6}$ | 2.2 | 13.2 | 10.0 | 0.42 |
| Example 6 | 41 | $Sm_{9.1}Fe_{71.9}Ta_{5.4}N_{13.6}$ | 4.3 | 12.5 | 6.5 | 0.36 |
| Comparative Example 6 | 42 | $Sm_{9.1}Fe_{77.3}N_{13.6}$ | 5.2 | 13.2 | 5.5 | 0.29 |

(1) Average Particle Diameter ($\mu$m),
(2) Br(kG),
(3) iHc(kOe)
(4) Hk/iHc

Example 7

Figure 2:
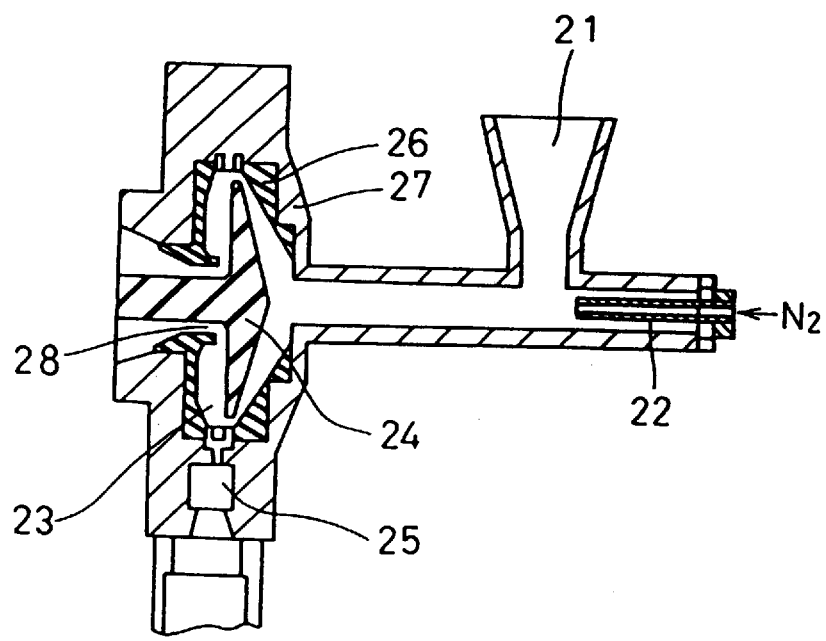
FIG. 2 is a cross-sectional view of a gas current type jet mill having a preliminary pulverizing section of one embodiment of the invention.

The same processes up to the nitriding treatment in Example 1 were followed in this example while Sm of 99.9% purity, electrolytic iron of 99.99% purity and Cr of 99.9% purity were used. After the nitriding treatment, a gas current type jet mill which had a spare pulverizing section with a structure shown in FIG. 2 and a center cone and pulverizing section made of $Al_2O_3$ was used to pulverize the alloy. Pulverization was carried out in a glove box. The oxygen in the glove box was replaced with nitrogen and had less than 100 ppm oxygen density. Nitrogen gas of 99.99% purity was used as the pulverizing gas, and the pulverizing gas pressure was 7 kgf/cm$^2$. As a comparison, a sample having no Cr was also prepared. The compositions, average particle diameters and magnetic properties are shown in Table 7.

TABLE 7

| Sample No. | Composition | (1) | (2) | (3) | (4) |
|---|---|---|---|---|---|
| Example 7 | 43 | $Sm_{9.1}Fe_{77.29}Cr_{0.01}N_{13.6}$ | 4.2 | 13.2 | 7.0 | 0.34 |
| Example 7 | 44 | $Sm_{9.1}Fe_{77.24}Cr_{0.06}N_{13.6}$ | 2.6 | 13.5 | 9.6 | 0.38 |
| Example 7 | 45 | $Sm_{9.1}Fe_{76.53}Cr_{0.77}N_{13.6}$ | 1.7 | 13.6 | 10.2 | 0.48 |
| Example 7 | 46 | $Sm_{9.1}Fe_{75.7}Cr_{1.6}N_{13.6}$ | 2.2 | 13.3 | 10.3 | 0.54 |
| Example 7 | 47 | $Sm_{9.1}Fe_{73.4}Cr_{3.9}N_{13.6}$ | 2.7 | 13.2 | 9.0 | 0.61 |
| Example 7 | 48 | $Sm_{9.1}Fe_{71.8}Cr_{5.5}N_{13.6}$ | 4.4 | 12.9 | 6.9 | 0.41 |
| Comparative Example 7 | 49 | $Sm_{9.1}Fe_{77.3}N_{13.6}$ | 5.2 | 13.2 | 5.5 | 0.29 |

(1) Average Particle Diameter ($\mu$m),
(2) Br(kG),
(3) iHc(kOe)
(4) Hk/iHc

Example 8

Samples were prepared as in Example 7 by using Sm of 99.9% purity, electrolytic iron of 99.99% purity and Mo of 99.9% purity. The compositions, average particle diameters and magnetic properties of the samples are shown in Table 8.

TABLE 8

| Sample No. | Composition | (1) | (2) | (3) | (4) |
|---|---|---|---|---|---|
| Example 8 | 50 | $Sm_{9.1}Fe_{77.29}Mo_{0.01}N_{13.6}$ | 4.2 | 13.2 | 6.3 | 0.32 |
| Example 8 | 51 | $Sm_{9.1}Fe_{77.25}Mo_{0.05}N_{13.6}$ | 2.9 | 13.6 | 9.1 | 0.41 |
| Example 8 | 52 | $Sm_{9.1}Fe_{77.14}Mo_{0.16}N_{13.6}$ | 1.2 | 13.7 | 11.0 | 0.51 |
| Example 8 | 53 | $Sm_{9.1}Fe_{75.7}Mo_{1.6}N_{13.6}$ | 1.4 | 13.5 | 11.2 | 0.52 |

TABLE 8-continued

| Sample No. | Composition | (1) | (2) | (3) | (4) |
|---|---|---|---|---|---|
| Example 8 | 54 | $Sm_{9.1}Fe_{73.2}Mo_{4.1}N_{13.6}$ | 2.5 | 13.1 | 9.6 | 0.42 |
| Example 8 | 55 | $Sm_{9.1}Fe_{71.9}Mo_{5.4}N_{13.6}$ | 3.9 | 12.2 | 6.9 | 0.30 |
| Comparative Example 8 | 56 | $Sm_{9.1}Fe_{77.3}N_{13.6}$ | 5.2 | 13.2 | 5.5 | 0.29 |

(1) Average Particle Diameter ($\mu$m),
(2) Br(kG),
(3) iHc(kOe),
(4) Hk/iHc

Example 9

Samples were prepared as in Example 7 by using Sm of 99.9% purity, electrolytic iron of 99.99% purity and W of 99.9% purity. The compositions, average particle diameters and magnetic properties of the samples are shown in Table 9.

TABLE 9

| | Sample No. | Composition | (1) | (2) | (3) | (4) |
|---|---|---|---|---|---|---|
| Example 9 | 57 | $Sm_{9.1}Fe_{77.29}W_{0.01}N_{13.6}$ | 4.0 | 13.4 | 7.0 | 0.34 |
| Example 9 | 58 | $Sm_{9.1}Fe_{77.24}Mo_{0.06}N_{13.6}$ | 2.0 | 13.5 | 9.9 | 0.43 |
| Example 9 | 59 | $Sm_{9.1}Fe_{77.16}W_{0.14}N_{13.6}$ | 1.3 | 13.5 | 11.9 | 0.45 |
| Example 9 | 60 | $Sm_{9.1}Fe_{76.5}W_{0.8}N_{13.6}$ | 1.2 | 13.4 | 12.1 | 0.52 |
| Example 9 | 61 | $Sm_{9.1}Fe_{75.3}W_{2.0}N_{13.6}$ | 2.1 | 13.2 | 10.0 | 0.42 |
| Example 9 | 62 | $Sm_{9.1}Fe_{71.9}W_{5.4}N_{13.6}$ | 3.9 | 12.1 | 7.8 | 0.30 |
| Comparative Example 9 | 63 | $Sm_{9.1}Fe_{77.3}N_{13.6}$ | 5.2 | 13.2 | 5.5 | 0.29 |

(1) Average Particle Diameter ($\mu$m),
(2) Br(kG),
(3) iHc(kOe),
(4) Hk/iHc

Example 10

The steps as in Example 1 were followed up to the nitriding treatment while Sm of 99.9% purity, electrolytic iron of 99.99% purity, Cr of 99.9% purity and Mo of 99.9% purity were used. After the nitriding treatment, the same gas current type jet mill as in Example 1 was used, except that the pulverizing section was made of stainless steel. The powder was pulverized so as to set the average particle diameter equal to 2 $\mu$m. The compositions, magnetic properties and pulverizing time of the samples are shown in Table 10.

TABLE 10

| Sample No. | Composition | * | ** | (2) | (3) | (4) |
|---|---|---|---|---|---|---|
| 64 | $Sm_{9.1}Fe_{76.53}Cr_{0.01}N_{13.6}$ | $Al_2O_3$ | 1 | 13.7 | 9.0 | 0.49 |
| 65 | $Sm_{9.1}Fe_{76.5}Mo_{0.8}N_{13.6}$ | $Al_2O_3$ | 1.2 | 13.6 | 10.1 | 0.47 |
| 66 | $Sm_{9.1}Fe_{76.53}Cr_{0.77}N_{13.6}$ | stainless steel | 4.1 | 13.2 | 10.1 | 0.46 |
| 67 | $Sm_{9.1}Fe_{76.5}Mo_{0.8}N_{13.6}$ | stainless steel | 4.4 | 13.1 | 10.5 | 0.45 |

(2) Br(kG),
(3) iHc(kOe),
(4) Hk/iHc,
* Material of Pulverizing Section
** Pulverizing Time The pulverizing time required to pulverize a sample including Cr to 2 $\mu$m by a gas current type jet mill whose pulverizing section is made of $Al_2O_3$ is indicated as 1 (standard time) in Table 10. As a comparison, samples having the composition of $Sm_{9.1}Fe_{77.3}N_{13.6}$ were pulverized for five times as long as the standard time (1). Even though a gas current type jet mill having a $Al_2O_3$ or stainless steel pulverizing section was used, the alloy cannot be pulverized to a 2 $\mu$m average particle diameter.

Example 11

A compression molding method using a thermosetting resin is now explained. Powder prepared in Example 10 (Sample No. 64) was used as a sample powder. Solid epoxy resin (for example, bisphenol A type epoxy resin) and a latent hardening agent (amine-adduct) were dissolved in methylethyl ketone, thus preparing a solution. The sample powder was dipped and kept in the solution, and was then stirred and kneaded so as to adhere to the resin. A compound was prepared by drying the powder in a nitrogen atmosphere. The compound had 3% by weight of resin, and the weight ratio between the solid epoxy resin and the latent hardening agent was 4:1. The compound was molded by compression in a 19 kOe magnetic field and with 10 ton/cm$^2$ pressure. Then, a curing treatment was directed to the compound in a nitrogen atmosphere at 160° C. for one hour, thereby preparing a bonded magnet. The bonded magnet had 9.1 kG residual magnetic flux density (Br), 8.9 kOe coercivity (iHc), and 8.2 MGOe maximum energy product ((BH)max).

Example 12

An injection molding method using thermoplastic resin is explained below. The powder prepared in Example 10 (sample No. 65) was used as a sample powder. The sample powder and polyamide resin (Nylon 6) were kneaded in a nitrogen atmopshere at 260° C. by a kneader, thus preparing a composition. The composition had 9% by weight of resin. A bonded magnet was prepared by molding the compound with 15 kOe applied magnetic field, 100° C. mold temperature, 280° C. injection temperature and 750 kg/cm$^2$ injection pressure. The bonded magnet had 6.5 kG residual magnetic flux density (Br), 8.0 kOe coercivity (iHc) and 8.7 MGOe maximum energy product ((BH)max).

Example 13

A molded material using a low-melting metal is explained. The powder prepared in Example 4 (sample No. 25) was used as a sample powder. Zn was added and mixed in the sample powder. The mixed powder had 9% by weight of Zn. The mixed powder was then molded by a compression molding method applying 1.5 ton/cm$^2$ in a 19 kOe magnetic field, thus preparing a molded material. A hot press operation was carried out on the molded material with 10 ton/cm$^2$ pressure in a nitrogen atmosphere at 450° C., thus preparing a bonded magnet. The bonded magnetic had 9.0 kG (residual magnetic flux density Br), 9.4 kOe (coercivity iHc) and 16.1 MGOe maximum energy product ((BH)max).

The invention may be embodied in other forms without departing from the spirit or essential characteristics thereof. The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. A method of manufacturing a rare earth-iron-nitrogen-based magnetic material, comprising the steps of:

preparing a mother alloy;

roughly pulverizing said mother alloy;

nitriding said mother alloy; and pulverizing said nitrided mother alloy;

wherein roughly pulverized rare earth-iron-nitrogen based magnetic material having a composition of the following chemical formula is pulverized by a gas current jet mill;

$$RaFe(100-a-b-c)MbNc$$

where R is selected from the group consisting of at least one rare earth element and Y; M is at least one element selected from the group consisting of Ti, Zr, Hf, V, Nb, Ta, Cr, Mo and W; N is nitrogen; and a, b and c are atomic percentages, with $5 \leq a \leq 20$, $0.05 \leq b \leq 5$, $3 \leq c \leq 30$, and the remainder being Fe.

2. The method of claim 1, wherein the rare earth element comprises at more than 50 atom % of Sm.

3. The method of claim 1, wherein the rare earth-iron-nitrogen based magnetic material comprises a main phase having a rhombohedral $Th_2Zn_{17}$ crystal structure.

4. The method of claim 1, wherein the nitrided mother alloy is pulverized to particles having an average particle diameter of 0.01–6 μm.

5. The method of claim 4, wherein the nitrided mother alloy is pulverized to an average particle diameter of 0.1–3 μm.

6. The method of claim 1, wherein the gas current jet mill comprises a pulverizing section made of at least one material selected from the group consisting of $Al_2O_3$, SiC, $Si_3N_4$ and $ZrO_2$.

7. The method of claim 1, wherein the nitrided mother alloy is pulverized with the gas current jet mill by particles colliding with themselves or by collisions with an inner wall of a pulverizing chamber.

8. The method of claim 1, wherein the gas current jet mill comprises an auxiliary pulverizing section.

9. The method of claim 1, wherein the pulverized nitrided mother alloy is molded with resin or a low-melting point metal.

10. The method of claim 9, wherein the pulverized nitrided mother alloy is molded with resin and the resin is at least one resin selected from the group consisting of thermosetting resin and thermoplastic resin.

11. The method of claim 9, wherein the rare earth-iron-nitrogen based magnetic material is molded by at least one method selected from the group consisting of compression molding and injection molding.

12. A method of manufacturing a rare earth-iron-nitrogen based magnetic material, comprising the steps of:

preparing a mother alloy;

roughly pulverizing said mother alloy;

nitriding said mother alloy; and pulverizing said nitrided mother alloy;

wherein roughly pulverized rare earth-iron-nitrogen based magnetic material having a composition of the following chemical formula:

$$RaFe(100-a-b-c)MbNc$$

where R is selected from the group consisting of at least one rare earth element and Y; M is at least one element selected from the group consisting of Ti, Zr, Hf, V, Nb, Ta, Cr, Mo, and W; N is nitrogen; and a, b and c are atomic percentages, with $5 \leq a \leq 20$, $0.05 \leq b \leq 5$, $3 \leq c \leq 30$, and the remainder being Fe, is pulverized by a gas current jet mill to obtain powder having a particle size of 0.01–6 μm having a coercivity force (iHc) of at least 8.1 kOe and a residual magnetic flux density (Br) of at least 13.1 kG, and showing a Hk/iHc value that is at least 0.38.

13. The method of claim 12, wherein the rare earth element comprises more than 50 atom % of Sm.

14. The method of claim 12, wherein the rare earth-iron-nitrogen based magnetic material comprises a main phase having a rhombohedral $Th_2Zn_{17}$ crystal structure.

15. The method of claim 12, wherein the nitrided mother alloy is pulverized to e an average particle diameter of 0.1–3 μm.

16. The method of claim 12, wherein the gas current jet mill comprises a pulverizing section made of at least one material selected from the group consisting of $Al_2O_3$, SiC, $Si_3N_4$ and $ZrO_2$.

17. The method of claim 12, wherein the nitrided mother alloy is pulverized with the gas current jet mill by particles colliding with themselves or by collisions with an inner wall of a pulverizing chamber.

18. The method of claim 12, wherein the gas current jet mill comprises an auxiliary pulverizing section.

19. The method of claim 12, wherein the pulverized nitrided mother alloy is molded with resin or a low-melting point metal.

20. The method of claim 19, wherein the pulverized nitrided mother alloy is molded with resin and the resin is at least one resin selected from the group consisting of thermosetting resin and thermoplastic resin.

21. The method of claim 19, wherein the rare earth-iron-nitrogen based magnetic material is molded by at least one method selected from the group consisting of compression molding and injection molding.

* * * * *